Nov. 14, 1967 D. J. MARSHALL 3,352,161
WHEEL BALANCING STAND
Filed March 4, 1965 2 Sheets-Sheet 1
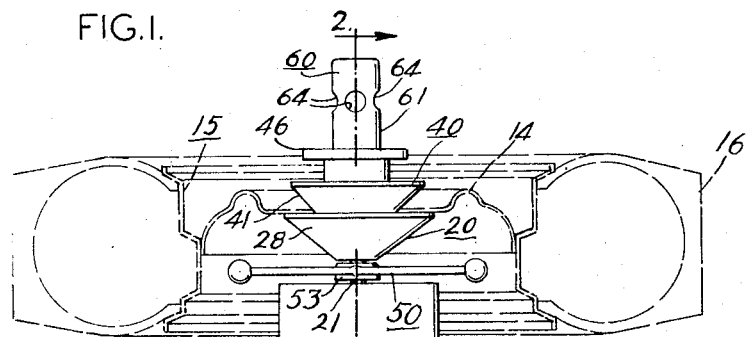
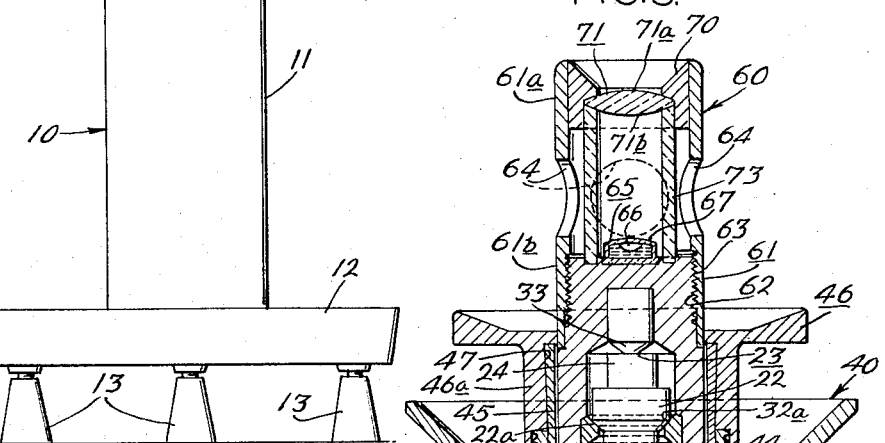
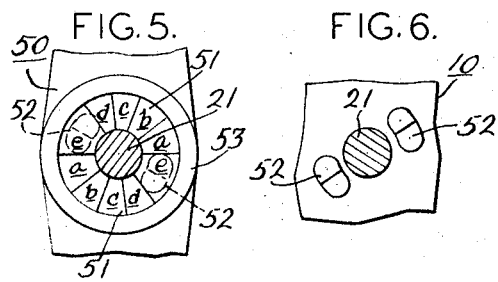
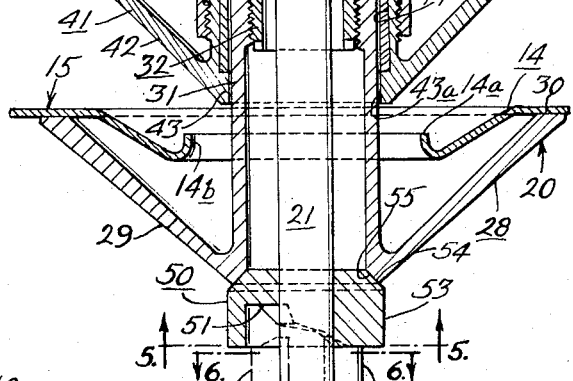
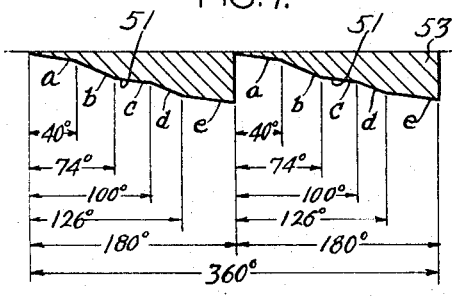
INVENTOR:
DON J. MARSHALL
BY Howson & Howson
ATTYS.

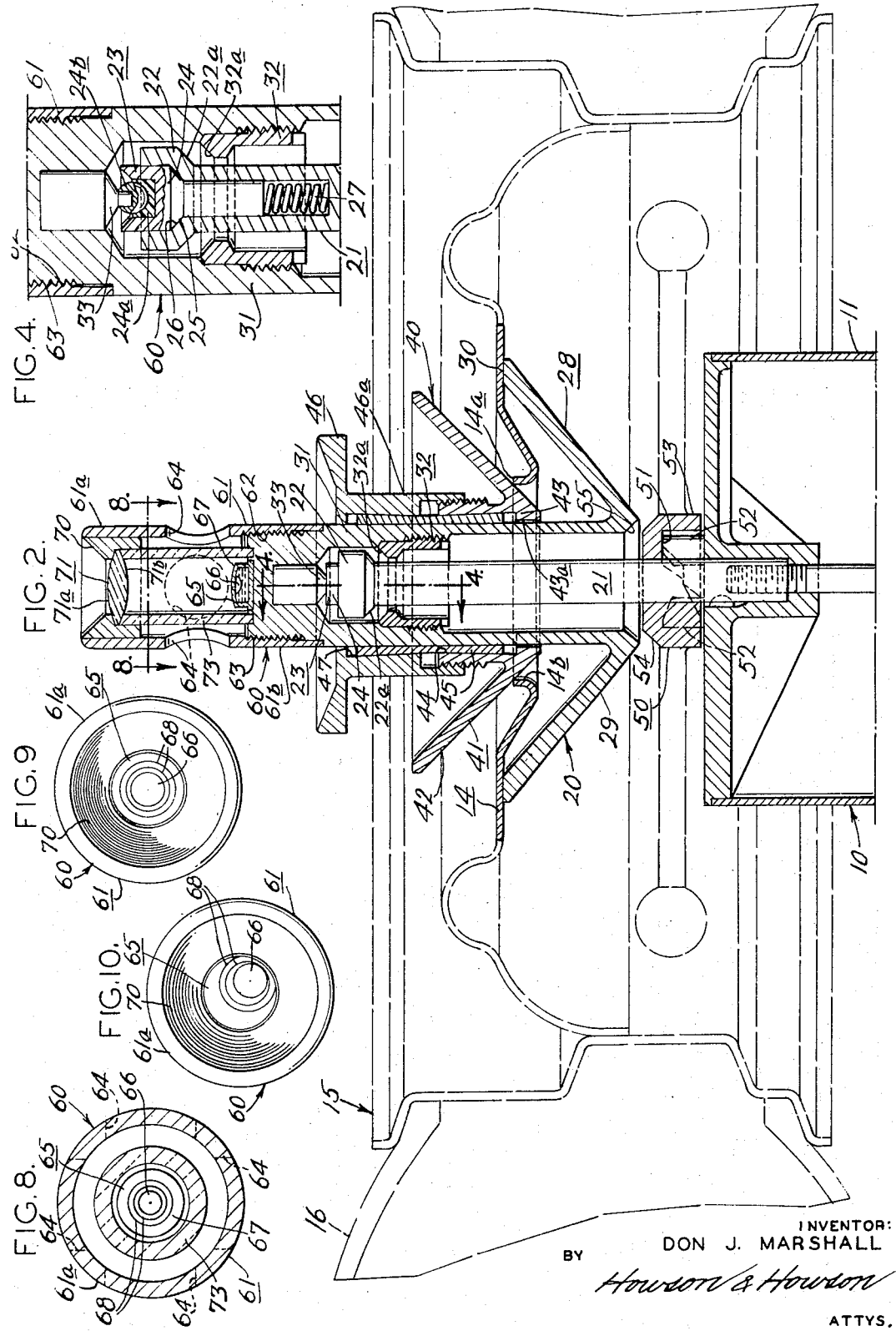

United States Patent Office 3,352,161
Patented Nov. 14, 1967

3,352,161
WHEEL BALANCING STAND
Don J. Marshall, Edgewater, Md., assignor to Goodall Semi-Metallic Hose & Mfg. Co., Philadelphia, Pa., a corporation of Pennsylvania
Filed Mar. 4, 1965, Ser. No. 437,219
16 Claims. (Cl. 73—484)

ABSTRACT OF THE DISCLOSURE

A wheel balancing stand having wheel engagement means for supporting the hub of a wheel, means for centering the hub on the engaging means and locking the hub to the engagement means, and including a novel static tire balancing indicator and novel support pivots for the wheel engagement means. Also disclosed is a spindle lock having camming surfaces acting, in conjunction with followers to relieve compression and pressure on the bearings when a wheel is positioned on the engagement means.

---

The present invention relates to measuring devices, and more particularly to a wheel balancing stand for mounting and measuring the center of mass of a wheeel (including a tire and rim) relative to the center of rotation of the wheel.

It is well known that any eccentricity of the center of mass to the center of rotation of a wheel, including a tire and rim, will, upon rotation, especially at the speeds common to today's highways, develop contrifugal forces sufficient to cause destructive pounding and vibrations. It has been established that the resulting vibration and pounding causes loss of useful life of the tire and the suspension to which the wheel is connected. As may readily be imagined, this causes great financial loss to the motoring public, but in addition the spot wear of the tires leads to early and unexpected sudden failure of the tires. Recent figures published by the National Safety Council state that the spot wearing of the tires is responsible for nearly 8% of the highway accidents. In addition to driver fatigue, component fatigue on various components on the motor vehicle such as shock absorbers and the like is another contributing factor to the highway death toll which is directly attributable to excess vibrations of the vehicle caused by imbalance of the hub and tire combination.

As is evident in the prior art, sophisticated "dynamic" tire balancers, normally of costly construction due to their complexity, and which normally require considerable floor space in installation, require a skilled operator for determining and correcting the deficiencies in the tire and hub, or wheel combination. The high initial cost, economic loss due to loss of floor space, and the requirement of higher priced labor for proper operation has kept these machines out of the service center and the average garage, and thus has deprived the general public of their much needed service.

Also evident in the prior art are the less sophisticated static wheel balancing machines, to which class the present invention belongs. The static balancers of the prior art, are, almost without exception, built and sold with low price seemingly the sole object. Being so manufactured, these machines are generally deficient in the following respects: first, almost universally there is a lack of any accurate and positive means for centering the hub or rim of the wheel on the machine with reference to the axis of gyration of these machines; second, there is a lack of a proper bearing at the center of gyration; and third, there is a notable lack of any means for prevention of human errors in reading the read-out display of such machines, which errors are normally due to refraction and parallax in the read-out display.

It is obvious that as the centrifugal forces acting upon the axis at the center of rotation of a wheel are the direct result of rotating mass eccentricity to the axis of rotation, correction of the eccentricity will eliminate the destructive forces and vibrations resulting therefrom. Thus a principal object of the present invention is to provide instrumentation for measuring and determining the center of mass of a tire and rim on which it is mounted, relative to the center of rotation.

Thus a principal object of the present invention is to provide, at a reasonable cost, a consistently accurate wheel balancing instrument for determining and correcting the mass eccentricity of a wheel through the use of novel structure constructed in accordance with accepted engineering theory cognizant of the physical laws governing forces and material behavior.

Another object of the present invention is to provide a pivot bearing structure for the means for engaging the hub of a wheel, which structure is at all times self-centering, self-lubricating, and self-compensating for wear while in addition being impervious to the brinelling, chipping and spalling due to abuse which quickly destroys any degree of accuracy inherent in prior art machines when new.

Still another object of the present invention is to provide novel means for engaging the hub of a wheel and novel locking means for centering the hub to the hub engagement means so as to permit free movement of the wheel.

Another object of the present invention is to provide a novel balance attachment for the wheel stand of the present invention, which balance attachment has means for indicating errors in parallax due to the position of the eye relative to the level.

Other objects and a fuller understanding of the invention may be had by referring to the following description taken in conjunction with the claims and the accompanying drawings in which:

FIG. 1 is a side elevation view of a wheel stand constructed in accordance with the present invention, and illustrating in fragmentary form, a wheel mounted thereon;

FIG. 2 is an enlarged fragmentary sectional view taken along line 2—2 of FIG. 1;

FIG. 3 is a fragmentary sectional view of a portion of the apparatus illustrated in FIG. 2 and illustrating part of the apparatus shown in FIG. 2 in a different position;

FIG. 4 is an enlarged fragmentary sectional view taken along line 4—4 of FIG. 2;

FIG. 5 is a fragmentary sectional view taken along line 5—5 of FIG. 3 and as if FIG. 3 were not fragmentized;

FIG. 6 is a fragmentary sectional view taken along line 6—6 of FIG. 3 and as if FIG. 3 were not fragmentized;

FIG. 7 is a layout of the apparatus illustrated in FIG. 5;

FIG. 8 is an enlarged fragmentary sectional view taken along line 8—8 of FIG. 2;

FIG. 9 is an enlarged plan view of a portion of the apparatus illustrated in FIG. 2 and as if FIG. 2 were not fragmentized; and FIG. 10 is another plan view of the apparatus illustrated in FIG. 9 as seen from an off center position.

Referring now to the drawings, and especially FIG. 1, a wheel balancing stand 10 comprising a support tube or frame 11 is supported on a base 12 having adjustable leveling legs 13. On top of the frame 11 is wheel engagement means 20 for supporting a hub 14 of a wheel 15, and having a tire 16 peripherally mounted on the hub 14. Above the wheel engaging means 20 is a locking centering cone 40 for securing the hub 14 to the wheel engagement means 20 while simultaneously centering the hub relative to the engagement means. Mounted on the wheel engagement means 20 is a novel static tire balancing indicator 60 to determine errors in the static balance of the particular wheel mounted on the wheel engagement means 20.

In accordance with the invention, the wheel engagement means 20 is pivotally mounted with respect to the frame 11 to enable free movement of the engagement means upon the wheel 15 being mounted thereon. To this end, an upstanding member comprising a vertically oriented shaft 21 is connected to and projects exteriorly of the frame 11 and includes, at its extended terminus 22, a first bearing means 23. (See FIGS. 2–4.) In the present instance as illustrated in FIG. 4, and in accordance with a feature of the invention, the first bearing means 23 comprises an upwardly biased pivot cone 24 having a conical centering flank 25 for seating in a like portion 26 interiorly of the extended terminus 22 of the shaft 21. Mounted interiorly of the pivot cone 24 is a seat 24a of polymerized fluorocarbon resin, in the present instance preferably Teflon, to receive a pivot ball 24b associated with a second bearing means 33. Biasing means, in the present instance a spring 27, insures the pressing of the seat 24a into the pivot ball 24b thereby reducing the risk of dirt depositing in the bearings. Further, the use of a material such as Teflon as the seat material for the pivot ball 24b permits of cost saving as well as providing a more rigid and rugged overall structure. As is well known, Teflon is a polytetrafluoroethylene sold by E. I. du Pont de Nemours & Co. Another substitute for Teflon, also of the class of polymerized fluorocarbon resins is Kel-F, a polytrifluorochloroethylene material sold commercially by M. W. Kellogg Company. For purposes of the present invention, the particular material used may be loaded with, for example, sintered powdered metal matrices or may be unloaded, virgin, polymerized fluorocarbon resins, dependent upon the thicknesses and support for the seat material.

The use of a polymerized fluorocarbon resin, preferably Teflon, affords positive shielding of the precision spherical pivot bearing from abuse, brinelling, chipping and the like. It should be noted that the Teflon should be placed in a position and of sufficient quantity so as to provide ample cushioning and to provide for an indefinitely long service life. In addition, the cold flow tendency of Teflon under pressure, which tendency causes the Teflon to creep upward out of its normal in use position, has been offset by carefully controlling the relative diameters of the ball and cavity so that cold flow cannot occur. However, the cold flow property of Teflon is invaluable in creating and maintaining for indefinite periods of time, the most precise and intimate fit of the seat and the ball.

As illustrated in FIGS. 2 and 4, the shaft 21 pivotably supports the wheel engagement means 20, the engagement means in the present instance comprising a downwardly projecting, truncated conical spindle 28 having an outwardly flared wall 29, which wall has an annular flat terminus 30 to support the hub 14 of the wheel 15. A tubular casing 31 projects upwardly from the spindle 28, circumscribing the shaft 21 and having mounted therein the second bearing means 33 for mating with the first bearing means 23 whereby relatively free movement of the spindle 28 is permitted.

To prevent inadvertent separation of the bearing means, which separation would permit the entry of dirt therebetween, means are provided internally of the tubular casing 31 to limit the upward movement thereof. To this end, an internal nut 32 having a conical seat 32a is provided for engaging a shoulder 22a carried on the shaft 21.

In accordance with another feature of the invention, the locking centering cone 40 provides accurate axial alignment of the hub 14 of the wheel 15 while engaging the circular periphery 14a of the aperture 14b of the hub when it is located against the annular flat terminus 30 of the outwardly flared wall 29 of the spindle 28. To this end, the locking centering cone 40 comprises a truncated cone 41 having an outwardly and upwardly flared wall 42, a central wall 43 and a center bore 43a to fit over the tubular casing 31, the outwardly flared wall 42 engaging the circular periphery 14a of the aperture 14b in the hub 14 so as to locate the hub relative to the spindle 28. (See FIG. 2.)

In addition to aligning the hub axially of the spindle, locking means are provided on the centering cone 40 to firmly engage the hub and prevent it from inadvertent movement relative to the spindle 28. To this end, the bore 43a of the centering cone 40 is provided with an annular, axially tapered radial recess 44 to receive therein at least one arcuate and axially tapered wedge 45, in the present instance the wedge 45 being tapered radially outwardly in both directions from the central portion thereof. A lock actuator 46, having a tubular depending portion 46a and an internal annular, radially and axially tapered recess 47 accommodating the upper portion of the wedge 45, is mounted concentrically of the tubular casing 31. In the present instance, engagement between the lock actuator 45 and the locking centering cone 40 is provided by internally mounted threads on the depending portion 46a and externally mounted threads on the tubular wall portion 43 associated with the centering cone 40.

The operation of the locking means is best illustrated in FIGS. 2 and 3, FIG. 2 illustrating the centering cone in the locked position and FIG. 3 illustrating the centering cone in the unlocked position. After the centering cone 40 is inserted in the hub and has forced the axial alignment of the hub 14 relative to the spindle, rotation of the actuator forces relative axial movement between the centering cone 40 and the actuator 45 causing them to separate and apply pressure to the wedges 45 causing a locking of the wedges against the tubular casing 31. (See FIG. 2.) Further rotation causes an axially downward forceful movement of cone 41 which causes locking of the hub 14 between the wheel engagement means 20 and the outwardly flared wall 42 of the locking centering cone 40.

In order to prevent inadvertent damage to the first or second bearing means when mounting the wheel onto the stand, and to provide limited rotation of the wheel relative to the stand utilizing an out of round gage, means are provided to position the spindle axially of the shaft 21. To this end, and as illustrated in FIGS. 5–7, a spindle lock 50 having at least one internally stepped cam surface 51, in the present instance two surfaces spaced 180°, is mounted within a hub 53, which is positioned concentrically of the shaft 21. The cam surfaces cooperate with upright cam followers or posts 52, mounted on the frame, to permit axial movement of the spindle 28 relative to the shaft 21. As illustrated in FIGS. 5 and 7, the cam surfaces 51 are provided with inclined steps, three in all labeled a–b, c–d, and e. The cam posts or followers 52 are provided with a side profile substantially identical to the step configuration of the cam surfaces a–b, and c–d. The hub 53 of the spindle lock or hand wheel 50 has an upwardly facing seating surface 54, in the present instance conical, to engage a like surface 55 on the spindle 28.

In operation, when the spindle lock 50 is in its lowest or first position, the cam followers or posts 52 engage the portion a–b as noted in FIG. 7. In this position the spindle 28 is relatively free floating. In the second position c–d, the hand wheel or spindle lock 50 is in a raised position wherein the seating surface 54 lies closely adjacent the seating surface 55 of the spindle 28 so as to permit relatively free rotation of the wheel 15 without wobble. In the second position, as substantially free rotation of the wheel is assured, it is a simple matter to place a run-out gauge on the wheel and thus permit out-of-round readings to be taken. In the third position, the cam followers or posts 52 rest against the surface e and the locking surface 54 firmly engages the seating surface 55 associated with the spindle 28 thereby raising the spindle 28 axially of the shaft 21 relieving pressure between the first and second bearing means and locking conical surfaces 22a and 32a holding spindle 28.

As set forth above, when the locking hand wheel or spindle lock 50 is in the first position the spindle 28 is free to rotate and gyrate relative to the shaft 21, thus permitting static balance readings of the wheel 15. To this end, and as illustrated in FIG. 2, the wheel balance indicator 60, mounted on the tubular casing 31, comprises a tubular casing 61 having an upper portion 61a and a lower portion 61b the lower portion 61b having internal threads 62 mating with external threads 63 of the tubular casing 31. As illustrated in FIG. 2, the casing 61 has circumferentially spaced light admitting apertures 64, and mounted in the lower portion 61b a level vial 65, having a gaseous bubble 66 therein. As illustrated in FIG. 8, the level vial 65 has a clear upper portion 67 having etched thereon an axially concentric target ring 68. In the upper portion 61a of the casing 60 is an eyepiece 70 mounting a magnifying lens 71 having an upper and lower surface 71a and 71b respectively. (See FIGS. 2 and 9.) Intermediate the vial 65 and the lens 71 is a clear tube 73 which serves to seal the upper portion 67 of the vial, and the lower surface 71b of the lens 71 while permitting light to pass therethrough.

As illustrated in FIG. 9 when the wheel 15 is in balance, the bubble 66 will appear, with the eye guided to proper position by the relative concentric positioning of the circular hairline on the vial 65 to be exactly in the center of the bullseye formed by the concentric visual impression.

On the other hand, even if the wheel and spindle are in a true state of balance, and the bubble is as shown in FIG. 9, i.e., centered in the target ring 68, if the eye shifts slightly off center the true reason for the apparent bubble movement becomes obvious as being due to the malcentering of the target ring relative to the eyepiece 70. If means were not provided to indicate errors due to parallax, the attendant would attempt to make a correction by adding weight to one or the other sides of the wheel to bring the bubble back into its "apparent" true center position, which, would be incorrect.

Thus the present invention provides a rugged support and wheel engagement means for a tire balancing instrument wheel stand and includes novel means for engaging and locking as well as radially and axially centering the hub of the associated wheel. Further, the provision of a novel spindle lock permits the easy mounting of the wheel on the tire stand by locking the wheel engaging means from movement. The spindle lock also provides an additional position for aiding the easy balancing of the wheel while providing still another position in which run-out or out-of-round readings may be taken. Further, with the novel tire balancing indicator of the present invention, an easily readable visual display is provided with means to prevent inaccurate readings due to parallax and/or refraction.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A wheel balancing stand comprising: a base having an upright frame; an upstanding member mounted on and projecting exteriorly of said frame and having at its extended terminus a first bearing means; a spindle having means thereon to receive and engage the hub of a wheel, said spindle including a tubular casing to receive therein said upstanding member; a second bearing means in said tubular casing and registerable with said first bearing means; a locking centering member mounted on said casing superimposed of said spindle and having means to engage and center said hub relative to said tubular casing; a spindle lock mounted about said upstanding member intermediate said spindle and said frame, said lock having an upwardly facing engaging portion and said tubular casing having a downwardly facing portion for engagement with said engaging portion of said lock; an axially stepped cam track element and a cam follower element, one of said elements connected to said spindle lock and the other of said elements connected to said frame, said elements cooperable to raise and lower said spindle lock upon rotation of said spindle lock.

2. A wheel balancing stand in accordance with claim 1 wherein said cam track has a first position wherein said engaging portion of said lock is spaced from said downwardly facing portion of said tubular casing whereby said spindle lock permits free movement of said spindle; a second position wherein said upwardly facing engaging portion of said lock lies closely adjacent said engaging portion of said tubular casing to permit substantially only rotation of said spindle; and a third position to engage said spindle from movement.

3. A wheel balancing stand in accordance with claim 1 wherein said spindle comprises a downwardly projecting truncated cone and wherein said means thereon to receive and engage the hub of said wheel comprises an outwardly flared wall.

4. A wheel balancing stand in accordance with claim 1 wherein one of said bearing means comprises a recessed, polymerized fluoro-carbon resin seat and the other of said bearing means comprises a ball engaging said recessed seat.

5. A wheel balancing stand in accordance with claim 1 wherein said first bearing means comprises an upwardly biased member mounted within the terminal portion of said shaft, and a polymerized fluoro-carbon resin seat mounted within said member; and wherein said second bearing means comprises a downwardly projecting ball engageable and rotatable in said seat.

6. A wheel balancing sand in accordance with claim 5 including a first shoulder mounted on said upstanding member, and a second shoulder mounted internally of said tubular casing below said first shoulder and spaced therefrom, said second shoulder engageable with said first shoulder to limit upward axial movement of said spindle.

7. A wheel balancing stand in accordance with claim 1 wherein said spindle lock includes a hub portion having said cam track element facing downwardly and mounted therein, said cam track element comprising a pair of cams having step portions spaced 180° from each other; said follower element comprising a pair of upwardly projecting posts spaced 180° from each other.

8. A wheel balancing stand in accordance with claim 1 wherein said centering member comprises a downwardly projecting truncated cone and said means to engage and center said hub includes an upwardly and outwardly flared wall; said cone having a central tubular wall portion to receive said tubular casing.

9. A wheel balancing stand in accordance with claim 8 including locking means on said centering cone to lock said centering cone to said tubular casing.

10. A wheel balancing stand in accordance with claim 9 wherein said locking means comprises a lock actuator having a tubular depending portion superimposed of said central tubular wall portion of said cone and engageable therewith; at least one of said tubular wall portions having an annular, axially extending recess with an axially tapered outer wall; at least one wedge having an axially tapered wall portion and receivable in said recess whereby, upon relative movement of said tubular depending portion and said tubular wall portion, said wedge is pressed against said tubular portion and engages said tubular casing.

11. A wheel stand in accordance with claim 10 wherein each of said tubular walls has axially extending, tapered recesses, the recess in said depending wall tapered outwardly and upwardly and the recess in said central wall tapered outwardly and downwardly; said wedge having an upper portion tapered outwardly and upwardly and a lower portion tapered outwardly and downwardly.

12. A wheel stand in accordance with claim 1 including a tire balance indicator mounted on said spindle, said indicator comprising an upstanding tubular casing having a level vial at the lower end thereof, and a gaseous bubble in said vial, a lens spaced upwardly from said vial and mounted interiorly of said casing; spaced first and second sighting means in said casing, said sighting means axially alignable whereby in viewing said bubble, said second sighting means is superimposed on said first sighting means to avoid errors in parallax.

13. A wheel stand in accordance with claim 12 wherein said first sighting means comprises etched circular hairline on said vial and said second sighting means comprising the inner periphery of an eyepiece.

14. A wheel balancing stand comprising: a base having an upright frame; a shaft mounted on and projecting exteriorly of said frame and having at its extended terminus a first bearing means; a spindle having an outwardly flared wall to receive and engage the hub of a wheel, said spindle including a tubular casing to receive therein said shaft; a second bearing means at the upper portion of said tubular casing and registerable with said first bearing means; a locking centering cone mounted on said casing, superimposed of said spindle and having an outwardly flared wall to engage and center said hub relative to said tubular casing; locking means on said centering cone to lock said hub against the wall of said spindle; a spindle lock mounted about said shaft between said spindle and said frame, said lock having an upwardly facing engaging portion and said tubular casing having a downwardly facing seating portion for engagement with said engaging portion of said lock; an axially stepped cam track element and a cam follower element, one of said elements connected to said spindle lock and the other of said elements connected to said frame, said elements cooperable to raise and lower said spindle lock upon rotation thereof; said cam track having a first position wherein said engaging portion of said lock is spaced from said downwardly facing seating portion of said tubular casing whereby said spindle lock permits free movement of said spindle, a second position wherein said upwardly facing engaging portion of said lock lies closely adjacent said engaging seating portion of said tubular casing to permit substantially only rotation of said spindle, and a third position whereby said upwardly facing engaging portion of said lock engages said seating portion of said casing to lock said spindle from movement.

15. A wheel balancing stand in accordance with claim 14 wherein said first bearing means comprises an upwardly biased pivot cone mounted within the terminal portion of said shaft, and a polytetrafluoroethylene seat mounted within said pivot cone; and wherein said second bearing means comprises a downwardly projecting ball engageable and rotatable in said seat.

16. A wheel balancing stand in accordance with claim 15 including a first shoulder mounted on said shaft, and a second shoulder mounted internally of said tubular casing below said first shoulder and spaced therefrom and engageable with said first shoulder when locking of said spindle from movement is desired.

References Cited
UNITED STATES PATENTS

| | | | |
|---|---|---|---|
| 1,701,464 | 2/1929 | Kraft | 73—483 |
| 2,306,528 | 12/1942 | Davis et al. | 73—483 |
| 2,674,122 | 4/1954 | Goltra | 73—484 |

JAMES J. GILL, *Primary Examiner.*